Patented May 30, 1944

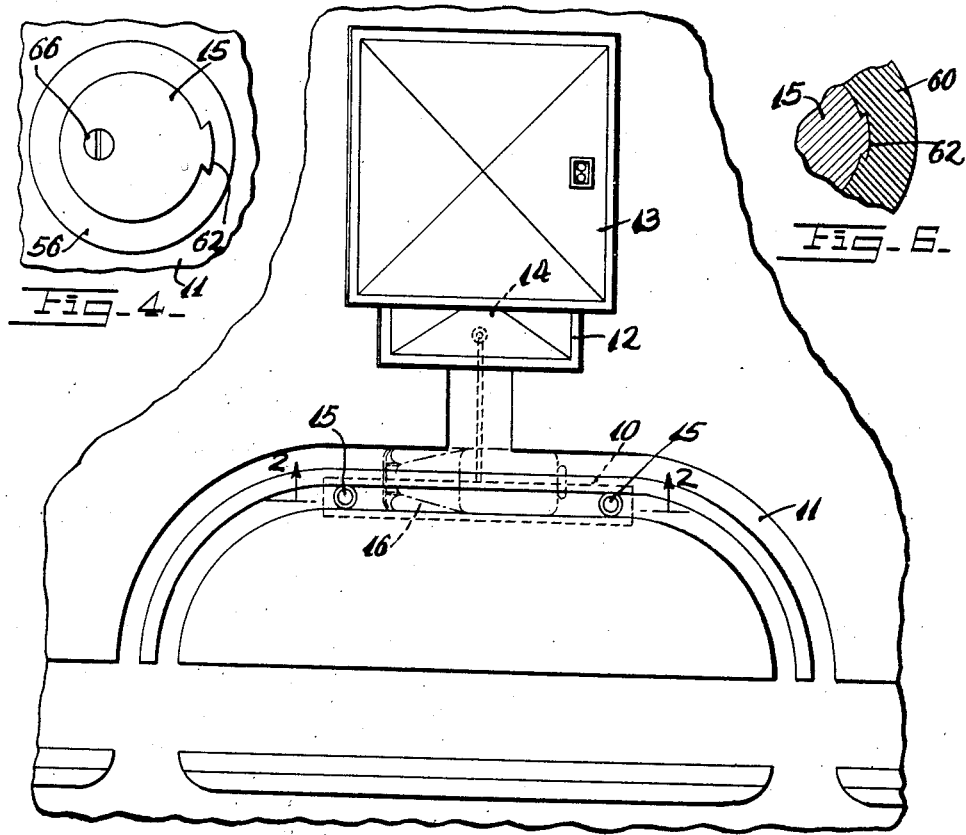
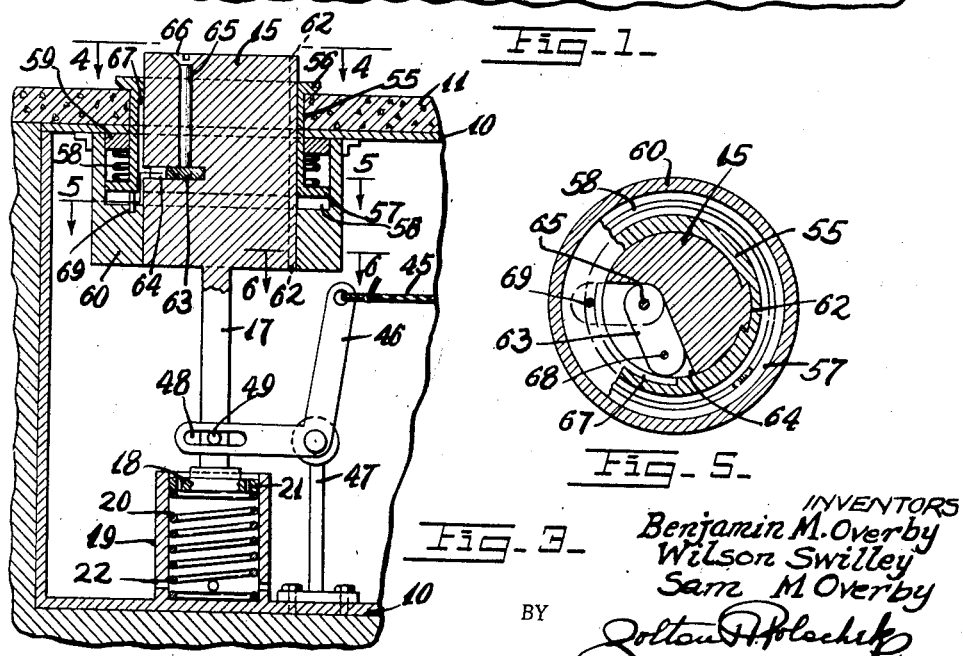

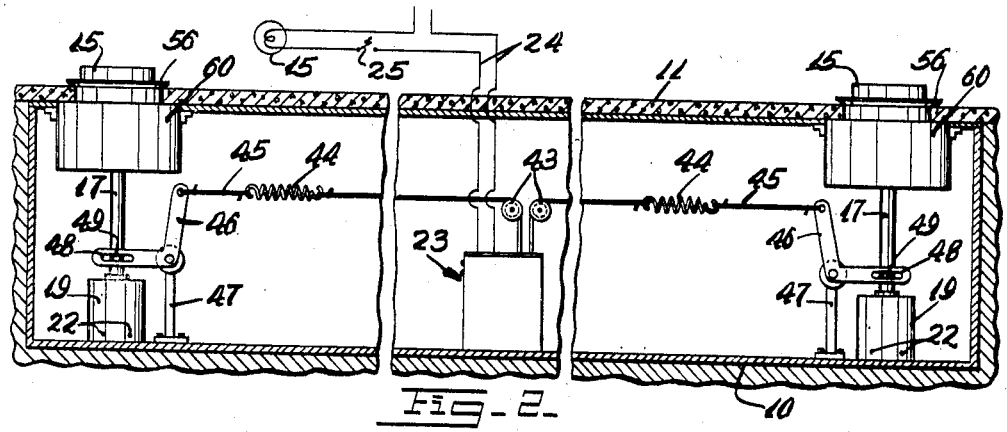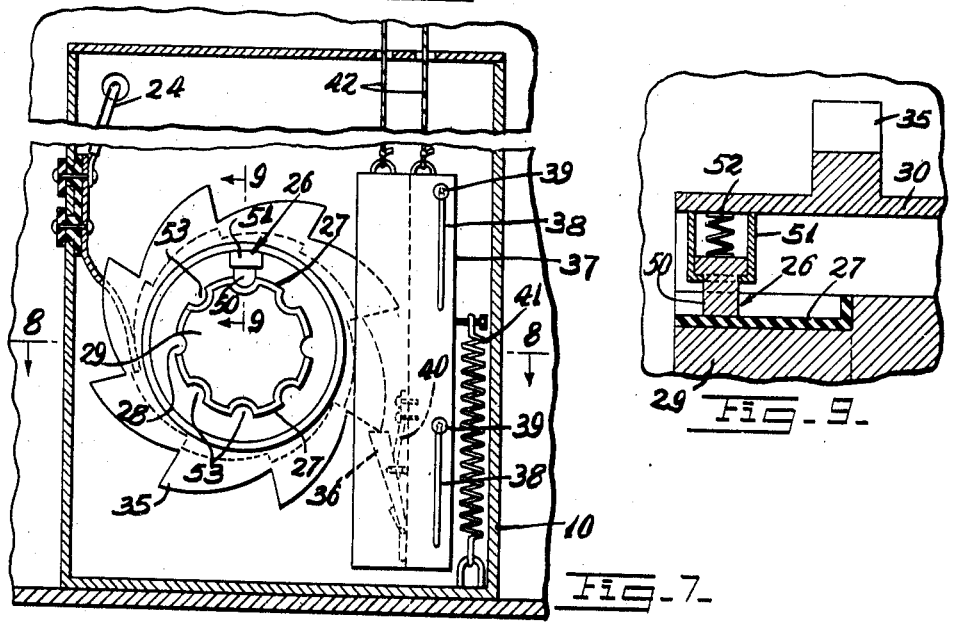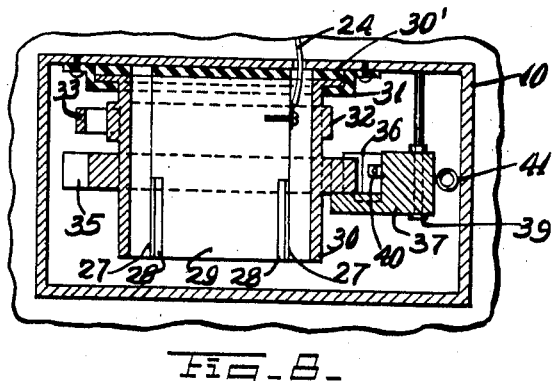

2,350,063

UNITED STATES PATENT OFFICE 2,350,063

DRIVEWAY SWITCH

Benjamin M. Overby, Brunswick, Wilson Swilley, Ray City, and Sam M. Overby, Brunswick, Ga.

Application September 14, 1943, Serial No. 502,240

8 Claims. (Cl. 200—85)

This invention relates to new and useful improvements in a driveway switch.

More particularly, the invention proposes switch mechanism for automatically turning on a porch light as an automobile draws up to the porch of a house, and automatically turning off the porch light as the automobile leaves.

Specifically, the invention proposes to characterize the new driveway switch by a pair of depressible piston-like buttons projecting from a casing adapted to be mounted beneath a driveway to the front of the porch of the house. It is proposed to associate these buttons with mechanism for operating the porch light, as stated.

It is proposed that the said depressible buttons be spaced longitudinally of the driveway and be located more than a car length of each other so that a car may stop in between the buttons.

A mechanism is proposed whereby the porch light will be turned on when one or the other of said buttons is depressed twice in succession, and turned off when one or the other of said buttons is depressed twice in succession. With this construction it is possible for the automobile to pass over one of the buttons so that its front and rear wheels depresses said button twice in succession. This will cause the light to be turned on. Similarly, when the automobile leaves one or the other of the buttons will be depressed twice in succession by the front and rear wheels, respectively.

Still further the invention contemplates the provision of resilient means for indirectly urging said buttons into a raised position.

The invention contemplates the use of a certain switch for controlling the porch light. It is proposed that this switch be mounted within the casing and have a rotative contact engaging an insulation member having spaced complementary stationary contacts. Means is proposed for advancing said rotative contact in steps to engage one of said stationary contacts each fourth step. A linkage system connects said buttons with said means for advancing said rotative contact one step each time one or the other of said buttons are depressed.

A novel means for latching said buttons in a depressed condition is also proposed usable when it is desired to place the driveway switch out of operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a house and driveway with a driveway switch constructed in accordance with this invention.

Fig. 2 is a fragmentary enlarged vertical sectional view taken on the line 2—2 of Fig. 1.

Fig. 3 is a transverse vertical fragmentary enlarged view of the left hand end of Fig. 2.

Fig. 4 is a fragmentary plan view looking in the direction of the line 4—4 of Fig. 3.

Fig. 5 is a fragmentary horizontal sectional view taken on the line 5—5 of Fig. 3.

Fig. 6 is a fragmentary horizontal sectional view taken on the line 6—6 of Fig. 3.

Fig. 7 is a fragmentary enlarged vertical sectional view of the central portion of Fig. 2.

Fig. 8 is a fragmentary horizontal sectional view taken on the line 8—8 of Fig. 7.

Fig. 9 is a fragmentary enlarged vertical sectional view taken on the line 9—9 of Fig. 7.

The driveway switch, according to this invention, includes a casing 10 adapted to be mounted beneath a driveway 11 to the front of a porch 12 or a house 13. This porch is provided with a porch electric lamp 14. A pair of depressible piston-like buttons 15 project from said casing 10 and from the driveway 11, and are spaced longitudinally of said driveway more than one car length from each other. This is schematically indicated in Fig. 1 by the dot and dash lines 16 which indicate the length of a car. This construction permits a car to stop in between the buttons 15.

Each button 15 is supported by a stem 17. Resilient means urges each stem 17 upwards for urging each button 15 into a raised position. Each stem 17 is connected with a piston 18 slidably mounted in a cylinder 19. An expansion spring 20 within each cylinder 19 urges each piston 18 into a raised position. Each piston 18 is provided with vent openings 21. This cylinder 19 has vent openings 22. This construction is such that the pistons may move freely in the cylinders.

A switch device 23 is located within the casing 10 and is connected with a circuit 24 for controlling said porch light 14. This circuit 24 is also provided with a manually operable switch 25 by which the circuit 24 may be opened to prevent lighting of the light 14. This is useful during blackouts. The switch mechansim 23 includes a rotative contact 26 engageable with insulation members 27 controlling a pair of spaced complementary stationary contacts 28. These stationary contacts 28 are in the nature of opposed grooves formed in a metallic cylinder 29 mounted on the casing 10 and insulated therefrom by an insulation gasket 30'. One of the leads of the circuit 24 connects with the metallic block 29.

Means is provided for advancing the rotative contact 26 in steps to engage one of said stationary contacts 28 each fourth step. This means includes a tubular member 30 rotatively supported upon the casing 10 and insulated therefrom by the gasket 30' and a complementary gasket 31. This tubular member 30 supports the contact 26. The tubular member 30 is arranged around the cylindrical block 29. The tubular member 30 is provided with eight ratchet teeth 32. A leaf spring 33 engages against one side of the ratchet teeth 32 and acts in the nature of a pawl for limiting turning of the tubular member 30 in one direction. This leaf spring 33 is also connected with one of the leads of the circuit 24. This construction supplies electric power to the contact 26. Electric power which flows from the leaf spring 33 enters the tubular member 30 and in this way reaches the contact 26.

The tubular member 30 is provided with eight additional ratchet teeth 35. These ratchet teeth 35 are engageable by a movable pawl 36 mounted upon a longitudinally slidable slide 37. The slide 37 has several slots 38 engaged by pins 39 which limit motion of the slide 37. A spring 40 mounted on the slide 37 urges the pawl 36 into operative position. A spring 41 is connected between the slide 37 and the casing 10 for urging the slide 37 in one direction. Cables 42 are connected with the slide 37 and extended over pulleys 43 rotatively supported on one of the walls of the casing 10. These cables 42 connect with springs 44 which in turn are connected with cables 45, in turn connected with one of the arms of the bell cranks 46. These bell cranks 46 are pivotally mounted intermediate of their ends on standards 47. The bell cranks 46 have their horizontal arms formed with slots 48 which are engaged by pins 49 projecting from the stems 17.

The rotative contact 26 is in the nature of a plunger 50 slidably mounted on a casing 51 mounted within and on the tubular member 30. A spring 52 disposed within the casing 51 normally urges the plunger 50 outwards. Said insulation members 27 have recessed portions 53 into which the plunger 50 may engage.

Each depressible piston-like button 15 is vertically slidably mounted through a collar 55. This collar 55 slidably extends through the casing 10 to a point adjacent the top face of the driveway 11. The collar 55 has a top flange 56 which may be manually gripped. The collar 55 has a bottom flange 57 which is engaged by an expansion spring 58 acting against an annular member 59 mounted on the bottom face of the top wall of the casing 10. A block 60 is fixedly mounted upon the bottom face of the top wall of the casing 10 and is formed with a recess 61 which engages around the flange 57.

The button 15 is provided with a vertically extending dovetailed tongue 62 which engages a complementary groove in the collar 55. This tongue 62 extends downwards and also engages a complementary groove in the block 60. A bolt 63 is disposed within a side recess 64 formed in the button 15. A stem 65 is rotatively mounted through the button 15 and has a top slotted head 66 by which it may be turned. This stem 55 is connected with said bolt 63. The collar 55 is formed with an internal recess 67 into which the outer extremity of the bolt 65 may engage. The outer end portion of the bolt 65 is formed with an opening 68 which is adapted to receive a pin 69 mounted upon bottom of the collar 55. The full lines in Fig. 6 show the bolt 63 in a retracted position. The dot and dash lines show it extended.

The operation of the device is as follows:

An automobile driving on the driveway 11, to reach the front of the house 13, will depress one or the other of the buttons 15 twice in succession. When the button 15 is depressed its stem 17 will be correspondingly depressed. The spring 20 urges the button 15 when released back into raised position. However, each time that it is depressed the pin 49 on the stem 17 indirectly draws a cable 42 for moving the slide 37 upwards. The pintle 36 which engages one of the teeth 35 will turn the tubular member 30 one-eighth of a revolution. The spring 33 prevents back turning of the tubular member, while the slide 37 is being moved back to its down position by the spring 41. The pawl 36 merely idles past the next ratchet tooth 35 during this time.

When the button 15 is depressed twice, the rotative contact 26 will advance two steps and reach one of the contacts 28. The circuit 24 is now closed at this point. When the automobile leaves and again depresses one of the buttons 15 twice in succession the movable contact 26 will advance two more steps and reach a position 180° from the position illustrated in Fig. 7. The circuit 24 is now open and the apparatus is in condition to operate similarly when another car comes along.

If it is desired to lock the contacts 15 in a depressed condition during blackout or other periods, it is merely necessary to depress each contact 15 and then with a screw driver turn the studs 65 of the contacts. By turning the studs 65 it is possible to first engage the bolts 63 within and against the bases of the recesses 67. Then the collars 55 must be lifted by raising the flanges 56. The studs 65 are then further turned so that the bolts 63 engage beneath the flanges 57 of the collars 55. When the collars 55 are now released the pins 69 will engage through the openings 68 of the bolts 63, latching the bolts in their operative positions. It should be noted that the springs 44 contract to take up any slack in the cables 42.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, and linkage means connecting said buttons with said means for advancing said rotative contact one step each time one or the other of said buttons are depressed.

2. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop betwen said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, and linkage means connecting said buttons with said means for advancing said rotative contact one step each time one or the other of said buttons are depressed, said resilient means including a piston connected with each stem, a cylinder for each piston, and a spring urging each piston upwards.

3. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, and linkage means connecting said buttons with said means for advancing said rotative contact one step each time one or the other of said buttons are depressed, said resilient means including a piston connected with each stem, a cylinder for each piston, and a spring urging each piston upwards, said springs being located within said cylinders.

4. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, and linkage means connnecting said buttons with said means for advancing said rotative contact one step each time one or the other of said buttons are depressed, said means for advancing said rotative contact including pins projecting from said stems, bell cranks pivotally mounted and having slots engaging said pins, cables connected with said bell cranks, springs connected with said cables, additional cables connected with said springs and with a slide indirectly controlling said rotative contact.

5. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, and linkage means connecting said buttons with said means for advancing said rotative contact one step each time one or the other of said buttons are depressed, said means for advancing said rotative contact including pins projecting from said stems, bell cranks pivotally mounted and having slots engaging said pins, cables connected with said bell cranks, springs connected with said cables, additional cables connected with said springs and with a slide indirectly controlling said rotative contact, said slide carrying a pawl engaging ratchet teeth upon a tubular member supporting said contact.

6. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, and linkage means connecting said buttons with said means for advancing said rotative contact one step each time one or the other of said buttons are depressed, said means for advancing said rotative contact including pins projecting from said stems, bell cranks pivotally mounted and having slots engaging said pins, cables connected with said bell cranks, springs connected with said cables, additional cables connected with said springs and with a slide indirectly controlling said rotative contact, said slide carrying a pawl engaging ratchet teeth upon a tubular member supporting said contact, said tubular member being rotatively mounted.

7. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, linkage means connecting said buttons with said means for advancing said rotative contact one step each time one or the other of said buttons are depressed, and means for latching said buttons in depressed positions.

8. A driveway switch, comprising a casing adapted to be mounted beneath a driveway and to the front of a porch of a house, a pair of depressible piston-like buttons projecting from said casing and spaced longitudinally of said driveway and more than a car length of each other so that a car may stop between said buttons, a stem for each button, resilient means for urging said stems upwards when the buttons are depressed, a switch for controlling a light for said porch and mounted within said casing and having a rotative contact engaging an insulation member having a spaced complementary stationary contact, means for advancing said rotative contact in steps to engage one of said stationary contacts each fourth step, linkage means connecting said buttons with said means for advancing said rotative contact one step each time one or the other of said buttons are depressed, and means for latching said buttons in depressed position, comprising a collar slidably and non-rotatively mounted upon each button, a stationary block slidably and non-rotatively constructing each of said buttons, a bolt movably mounted on each button and cooperative with pins connected with said collars.

BENJAMIN M. OVERBY.
WILSON SWILLEY.
SAM M. OVERBY.